United States Patent

[11] 3,577,013

[72] Inventor Eric J. Hoffman
Baltimore, Md.

[21] Appl. No. 757,872
[22] Filed Sept. 6, 1968
[45] Patented May 4, 1971

[73] Assignee The United States of America as represented by the Secretary of the Navy

[54] LOW STANDBY POWER MONOSTABLE MULTIVIBRATOR HAVING NONCRITICAL CUTOFF
12 Claims, 1 Drawing Fig.

[52] U.S. Cl. .......... 307/273, 307/288
[51] Int. Cl. .......... H03k 3/26
[50] Field of Search .......... 307/273, 288; 328/207

[56] References Cited

UNITED STATES PATENTS

| | | | |
|---|---|---|---|
| 3,193,701 | 7/1965 | Lawhon | 307/288X |
| 3,215,852 | 11/1965 | Brode et al. | 307/273 |
| 3,244,906 | 4/1966 | Goering | 307/288X |
| 3,277,314 | 10/1966 | Munoz | 307/288 |
| 3,321,645 | 5/1967 | Webb | 307/288 |

OTHER REFERENCES

PUB I " A Monostable Multivibrator" by Vance in the MOTOROLA MONITOR, Vol 2 No 3, dated 1964 (copyright date) page 25.

PUB II. " Noise Immune Multivibrator" by Kolodin in RCA TECHNICAL NOTES, RCA TN No. 248 dated Jan 5, 1959 (received in Scientific Library)

*Primary Examiner*—Stanley D. Miller, Jr.
*Attorney*—R. S. Sciascior & J. A. Cooke

ABSTRACT: A monostable multivibrator circuit, or one-shot, which consumes virtually no power while in its standby state and having noncritical cutoff. Under quiescent conditions all circuit transistors are nonconductive and a circuit capacitor is fully charged. An input signal causes a first transistor to become conductive and thereby causes the capacitor to discharge exponentially from a negative potential toward a positive potential. The discharge time associated with the capacitor determines the on-time of the instant one-shot. Second and third transistors are connected into the circuit in such a manner that the circuit regeneratively turns on and degeneratively turns off. Further, the circuit is provided with means for preventing false triggering by voltage spikes from the power supply or from the load.

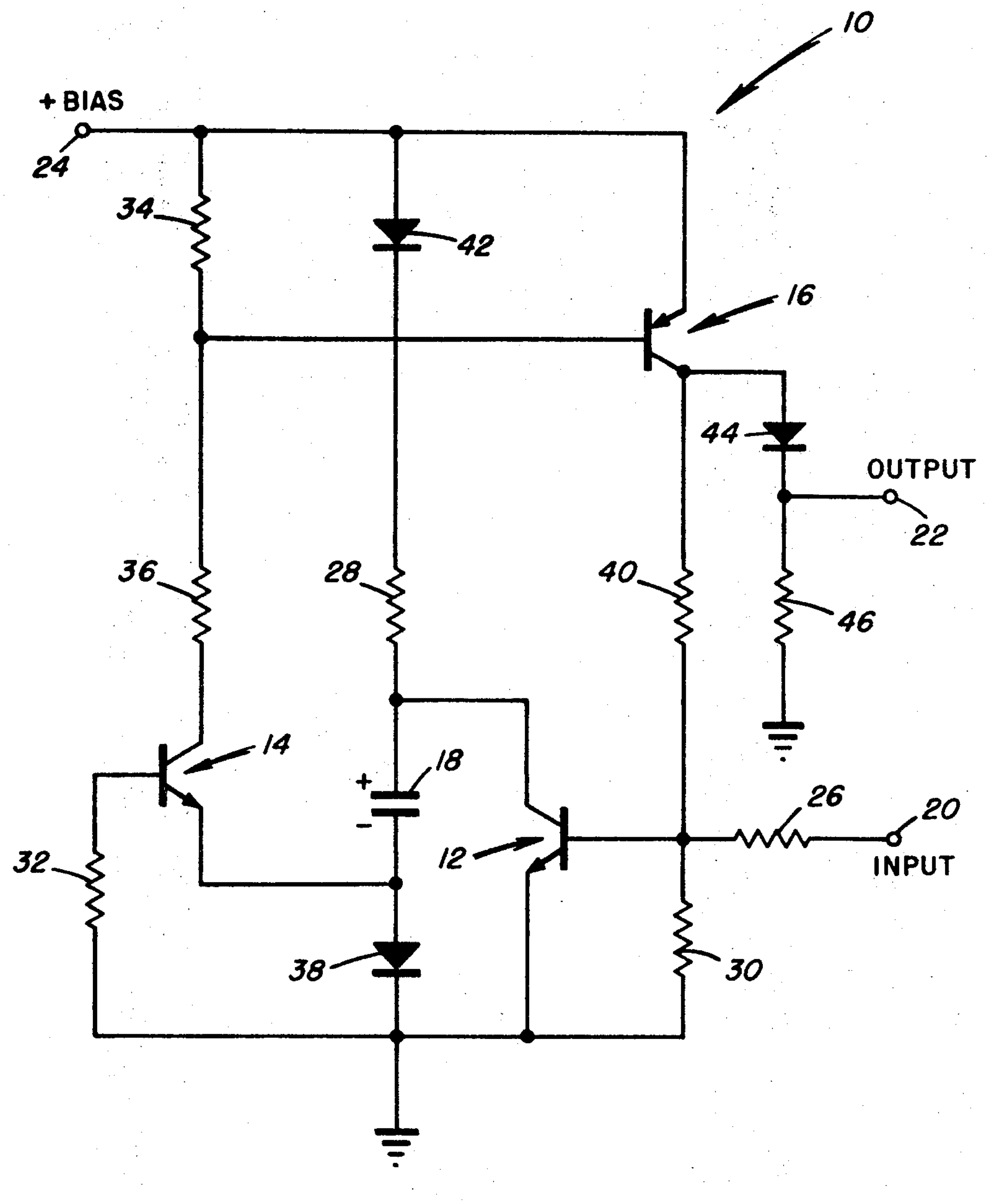
ERIC J. HOFFMAN
INVENTOR
BY J. O. Tresansky
ATTORNEY

LOW STANDBY POWER MONOSTABLE MULTIVIBRATOR HAVING NONCRITICAL CUTOFF

BACKGROUND OF THE INVENTION

1. Field of the Invention

The present invention relates to a monostable multivibrator circuit, or one-shot. More particularly, the instant invention relates to a circuit which is capable of responding to an input signal by issuing a pulse of a preset amplitude and noncritical duration whenever said input signal meets a predetermined set of voltage requirements.

2. Description of the Prior Art

In the past, one-shot circuits have consumed power both in the quiescent and in the active states. In terms of average power consumption, this is extremely inefficient since in most applications the one-shot is quiescent a large majority of the time. A familiar type of one-shot circuit comprises three transistors connected in such a manner that when the circuit is in its standby state one transistor is conductive and the other two are nonconductive. In response to an input signal meeting a predetermined set of voltage requirements, all of the transistors change states—that which was conductive becoming nonconductive and those which were nonconductive becoming conductive. This change of state is indicated at an output terminal which issues a pulse having a preset amplitude and generally unstable duration provided the input signal has met the said voltage requirements. A circuit functioning as described above can be found in U.S. Pat. No. 3,114,049 issued to Royer R. Blair on Dec. 10, 1963.

While the above-described one-shot is adequate for many purposes, it suffers from the disadvantage that there is a relatively large amount of power consumed even when the circuit is quiescent—this power consumption resulting from the fact that there is always at least one transistor in its conductive state. In many applications however, such as in the field of satellite technology, the attainment of minimum power consumption is of the utmost importance. Also another critical element is the pulse width stability of the output pulse. It is undesirable to have an output pulse whose width is randomly variable. It was with these factors in mind that the instant invention was developed.

SUMMARY OF THE INVENTION

The present invention relates to a one-shot circuit designed for use aboard an orbiting satellite. Since the conservation of energy is especially important in such an application, the instant circuit was designed to consume a minimum of power. In carrying out this objective, the one-shot of the present invention consumes its power only during its active state—virtually no power being consumed when quiescent.

The one-shot circuit herein described comprises, basically, three transistors, a capacitor, an input terminal, an output terminal, and a source of biasing potential. All of the three transistors are in their nonconductive states while the one-shot is quiescent; and all of the three transistors are in their conductive states when the one-shot is active. Since all of the transistors are nonconductive while the circuit is quiescent, it can be said that the quiescent power consumption is zero save for a small amount of power loss resulting from leakage currents. The output pulse produced by the subject invention is formed during the exponential discharge of the above-mentioned capacitor. As will be described in detail hereinafter, the circuit cutoff occurs during a linear and hence noncritical portion of the capacitor's exponential voltage rise, thereby providing for a stable output pulse width.

It is therefore an object of the invention to provide a one-shot circuit whose average power consumption is low.

It is another object of the invention to provide a one-shot circuit which consumes virtually no power while in its quiescent state.

It is a further object of the invention to provide a one-shot circuit which is incomplex and therefore both reliable in operation and inexpensive in fabrication.

It is yet another object of the invention to provide a one-shot circuit which cannot be triggered by voltage spikes originating in the power supply or in the load.

It is still yet another object of the invention to provide a monostable multivibrator having noncritical cutoff.

It is yet still another object of the invention to provide a monostable multivibrator having a stable output pulse width.

These and other objects of the invention, as well as many of the attendant advantages thereof, will become more readily apparent when reference is made to the following description taken in conjunction with the accompanying drawing.

BRIEF DESCRIPTION OF THE DRAWING

The sole FIG. is a circuit schematic of the present low-standby-power one-shot.

DESCRIPTION OF THE PREFERRED EMBODIMENTS

With reference to the sole FIGURE, there is first given a detailed description of the physical configuration of the present one-shot circuit, there following a detailed description of the circuit operation. The one-shot circuit of the present invention is shown generally at 10 and comprises, basically, a first transistor 12 of the NPN variety, a second transistor 14 of the NPN variety, a third transistor 16 of the PNP variety, a capacitor 18, an input terminal 20, an output terminal 22 and a biasing terminal 24 with its associated source of biasing potential (not shown). The base of transistor 12 is connected to the input terminal 20 through a resistor 26; the collector is connected to the biasing terminal 24 through a resistor 28 and is also connected to the upper plate of capacitor 18; and the emitter is connected directly to ground. A resistor 30 is connected between the base and emitter of transistor 12 and serves to maintain proper biasing conditions. The base of transistor 14 is connected to ground through a resistor 32; the collector is connected to the biasing terminal 24 through a pair of resistors 34 and 36; and the emitter is connected to the lower plate of capacitor 18. Also connected to the emitter of transistor 14 is the anode of a diode 38, the cathode of which is connected to ground. The base of transistor 16 is connected to the biasing terminal 24 through the resistor 34; the collector is connected to the base of transistor 12 through a resistor 40; and the emitter is connected directly to the biasing terminal 24.

Heretofore, there has been disclosed an operational one-shot circuit. However, the one-shot circuit shown in the FIGURE is provided with means for protecting against voltage spikes originating in the source of biasing potential or in the load. As will be explained below, the circuit is protected against false triggering from spikes in the source of biasing potential by a diode 42 which is connected between the biasing terminal 24 and the resistor 28. And as will also be explained below, the present one-shot circuit is protected against false triggering by spikes in the load by a diode 44 which is connected between the output terminal 22 and the collector of transistor 16. The circuit is also provided with a resistor 46 which is connected between the output terminal 22 and ground; but it should be mentioned that in most applications, the load circuit driven by the one-shot can substitute for resistor 46.

Before undertaking a detailed description of the circuit operation, it is thought timely to note the states in which the circuit components abide while the one-shot is quiescent. Across the upper and lower plates of the capacitor 18, there appears a voltage equivalent to that of the source of positive potential applied at the biasing terminal 24—the upper plate being positive with respect to the lower plate. All transistors 12, 14 and 16 remain in their nonconductive states, there being no flow of current in the circuit save for unavoidable leakage current. It should also be noted that the power source, or source of biasing potential, is hereafter referred to as a +12-volt source.

Upon the application of a positive pulse at the input terminal 20, the transistor 12 switches to its conductive state. Instantaneously, the upper plate of the capacitor 18 goes to 0 volts and the lower plate therefore goes to −12 volts—the voltage across a pair of capacitor plates being unable to change instantaneously. Since transistor 12 serves to ground the upper plate of capacitor 18, it can be said that transistor 12 is a grounding transistor. With the lower plate of capacitor 18 at −12 volts transistor 14 is forward biased and therefore becomes saturated; and as a result of transistor 14 being saturated, a large current flows through resistor 34 causing a decreased voltage to appear at the base of transistor 16. In response to the decreased voltage at its base, transistor 16 switches to its conductive state; and when transistor 16 is conductive, the source of positive potential impressed upon the circuit at the biasing terminal 24 appears at the output terminal 22 and indicates that an input pulse meeting a predetermined set of voltage requirements was present. In addition, when transistor 16 is conductive, current flows through resistor 40; and this current flow provides the biasing necessary to keep transistor 12 latched on. It can therefore be said that transistor 16 is a biasing transistor. The regenerative action described above (the latching action) eliminates the necessity for a sustained input pulse.

After the one-shot circuit 10 has latched on, it remains in this state until a time dependent upon the discharge time associated with the capacitor 18. Capacitor 18 discharges as follows. With transistor 12 in its conductive state and with the lower plate of the capacitor 12 volts more negative than the upper plate, circuit current flows from capacitor 18 through transistor 12 and reaches the base of transistor 14 thus providing a small control current for said transistor 14. Transistor 14 is also supplied with a large current from the 12 volt source of positive potential acting through the biasing terminal 24 and resistors 34 and 36. In response to the currents entering its base and collector, transistor 14 expels a large emitter current. The emitter current emergent from transistor 14 cannot flow through diode 38 since said diode is reverse biased and therefore can only flow up through capacitor 18. It is this emitter current which discharges capacitor 18—the voltage across the capacitor rising exponentially from −12 volts toward +12 volts. The time constant and the exponential asymptote are determined by the voltage divider formed by resistors 32 and 36 and the collector and emitter resistance of transistor 14. It can therefore be said that transistor 14 is a discharging transistor.

When the voltage appearing at the lower plate of capacitor 18 reaches approximately 0 volts, transistor 14 switches back to its nonconductive state. With transistor 14 nonconductive, the voltage appearing at the base of transistor 16 increases and transistor 16 turns off. And with transistor 16 nonconductive, the source of bias for the base of transistor 12 is removed; and thus transistor 12 becomes nonconductive. With all of the transistors 12, 14 and 16 in their nonconductive states, there appears no signal at the output terminal 22.

Before continuing, it should be noted that as transistor 12 begins to come out of saturation, it releases its clamp on capacitor 18 and allows the capacitor to charge through resistor 28 causing a slight voltage rise across diode 38. This voltage rise causes transistor 14 to draw even less current and therefore degeneratively turns off all three transistors. The capacitor 18 then recharges to +12 volts and the one-shot 10 is ready for another input pulse—the charge time associated with capacitor 18 being dependent upon the value of resistor 28. As was mentioned above, transistor 14 is rendered nonconductive when capacitor 18 reaches approximately 0 volts. It will be recalled that the discharge of capacitor 18 is an exponential voltage rise from −12 volts to +12 volts. With transistor 14 being rendered nonconductive at approximately 0 volts, the circuit 10 turns off during the most linear portion of capacitor's 18 exponential voltage rise. By having circuit cutoff and hence cessation of output pulse formation at this linear, noncritical portion of the capacitor's exponential discharge, an output pulse having stable and nonvarying width is assured.

It was noted that the circuit of the present invention is able to protect against voltage spikes in the power supply. This protection is brought about through the means of the diode 42. Without the diode 42 appearing in the path between the biasing terminal 24 and the emitter of transistor 14, a negative spike originating in the source of biasing potential would cause the circuit 10 to turn on. This would result since the emitter of transistor 14 could not differentiate between a negative voltage caused by the capacitor 18 and a negative voltage caused by a negative spike in the power supply. The diode 42 isolates the emitter of transistor 14 from the biasing terminal 24 and thus from the power supply. It should be remembered that the one-shot 10 is inherently immune to positive voltage spikes originating in the power supply.

It was also noted above that the instant one-shot circuit can be made to protect against positive voltage spikes originating in the load. This protection is brought about through the means of the diode 44 and the resistor 46. Without the diode 44 appearing in the path between the output terminal 22 and the base of transistor 12, a positive voltage spike originating in the load would travel through the output terminal 22 and into the base of transistor 12 turning on the one-shot 10. This action would result since transistor 12 cannot differentiate between a positive signal originating at the input terminal 20 and one originating in the load. Diode 44 serves to isolate the load from the transistor 12. The resistor 46 serves to provide a discharge path between the load and ground. It should also be remembered that the one-shot 10 is inherently immune to negative voltage spikes originating in the load.

The diodes 42 and 44 and the resistor 46 serve to enhance the versatility of the one-shot 10. If protection against voltage spikes originating in the power supply or in the load were not desired, diodes 42 and 44 and resistor 46 could be removed from the circuit without sacrificing the circuit operation, save for protection against spurious signals.

It was noted above that the time during which a signal appears at the output terminal 22 is dependent upon the discharge time associated with capacitor 18. Thus, the on-time of the one-shot circuit 10 can be regulated by adjusting this discharge time; and the discharge time is dependent upon the values of resistor 36 and capacitor 18. Therefore, the on-time of the circuit can be regulated by varying the values of these components. It should here be noted that the amplitude of an input signal necessary to trigger the instant one-shot circuit is dependent upon the value of resistors 26 and 30. Therefore, by varying the value of these resistors, the trigger level of the one-shot 10 can also be regulated.

Below, there is a list of component values which yield a 1-second output pulse when the input signal is of the order of +6 volts and when the source of positive potential is +12 volts. It should be understood, however, that the on-time of the one-shot 10 and the amplitude of the voltage required to activate the circuit can be regulated by scaling certain of the components noted above. For the values given, the transistor and capacitor leakage currents (while the circuit is quiescent) total approximately 30 nanoamperes.

| | |
|---|---|
| Transistors 12 and 14 | 2N2222 |
| Transistor 16 | 2N2907 |
| Diodes | 1N3064 |
| C18 | 47 μf. |
| R26 | 4.7 K. |
| R28 | 1 K. |
| R30 | 22 K. |
| R32 | 150 K. |
| R34 | 22 K. |
| R36 | 33 K. |
| R40 | 11 K. |
| R46 | 5.6 K. |

It should be understood that the specific embodiments described above are given for illustrative purposes only and that the present invention is not limited thereto but can be modified in many ways without departing from the spirit and the scope of the invention. For example, the positive bias voltage supply can be modified to a negative bias voltage supply without affecting the operation of the instant invention providing the conductivity states of the individual transistors are reversed. It is therefore the intent that the scope of the invention not be limited to the above but only as set forth in the following claims.

I claim:

1. A monostable multivibrator comprising:
an input terminal for receiving an incoming signal;
an output terminal;
a source of bias voltage;
capacitive reactance means comprising:
a first capacitive plate connected to said bias voltage source and exhibiting a positive potential thereon; and
a second capacitive plate connected to ground and exhibiting zero potential thereon;
first semiconductor means comprising:
a control electrode connected to said input terminal for receiving said incoming signal, said control electrode being effective to render said first semiconductor means conductive if said incoming signal meets a predetermined voltage amplitude; and
first and second primary current conducting electrodes, said first primary current conducting electrode being connected to said first capacitive plate and said second primary current conducting electrode being connected to ground,
whereby when said first semiconductor means is rendered conductive by said incoming signal, the potential on said first capacitive plate drops to zero potential and the voltage on said second capacitive plate drops to a negative potential;
a second semiconductor means comprising a control electrode connected to ground, and first and second primary current conducting electrodes, said first primary current conducting electrode being connected to said source of bias voltage and said second primary current conducting electrode being connected intermediate said second capacitive plate and ground;
said second semiconductor means being rendered conductive when said second capacitive plate drops to said negative potential and the conduction current flow through said second primary current conducting electrode of said second semiconductor means causing the negative potential on said second capacitive plate to exponentially approach said positive potential;
a third semiconductor means effective to latch said first semiconductor means in the conductive state and comprising:
a control electrode connected intermediate said bias voltage source and said first primary current conducting electrode of said second semiconductor means; and
first and second primary current conducting electrodes, said first primary current conducting electrode being connected in parallel to said output terminal and to said control electrode of said first semiconductor means and said second primary current conducting electrode being connected to said bias voltage source;
whereby said third semiconductor means is rendered conductive when said second semiconductive means is rendered conductive; and
whereby an output pulse is produced while said third semiconductor means is in the conductive state, said output being produced until said exponential voltage rise on said second capacitive plate reaches approximately zero voltage.

2. The monostable multivibrator as claimed in claim 1 and further comprising voltage-dividing means for determining the characteristics of said exponential voltage rise.

3. The monostable multivibrator as claimed in claim 2 wherein said voltage-dividing means comprises:
first resistance means connected intermediate said first primary current conducting electrode of said second semiconductor means and said control electrode of said third semiconductor means; and
second resistance means connected intermediate said control electrode of said second semiconductor means and ground.

4. The monostable multivibrator as claimed in claim 3 and further including a diode comprising:
an anode connected to the junction of said second capacitive plate and said second primary current-conducting electrode of said semiconductor device; and
a cathode connected to ground;
whereby said diode allows said second semiconductor means to initiate and control said exponential voltage rise of said second capacitive plate.

5. The monostable multivibrator as claimed in claim 4 and further including biasing means effective to render said third semiconductor means conductive only when said second semiconductor means is conductive.

6. The monostable multivibrator as claimed in claim 5 wherein said biasing means comprises a resistor connected intermediate said bias voltage source and said first resistance means.

7. The monostable multivibrator as claimed in claim 6 wherein each of said first, second and third semiconductor means are transistors and further said control electrodes of said semiconductor means are bases of said transistors and said first and second primary current-conducting electrodes of said semiconductor means are collectors and emitters respectively of said transistors.

8. The monostable multivibrator as claimed in claim 7 and further comprising output noise immunity means.

9. The monostable multivibrator as claimed in claim 8 wherein said output noise immunity means is a diode connected intermediate said collector of said third transistor and said output terminal.

10. The monostable multivibrator as claimed in claim 9 and further including a resistor connected intermediate said output terminal and ground.

11. The monostable multivibrator as claimed in claim 10 and further comprising bias voltage source noise immunity means.

12. The monostable multivibrator as claimed in claim 11 wherein said bias voltage source noise immunity means comprises a diode connected intermediate said bias voltage source and said capacitive reactance means.